PROTECTION SYSTEMS AND APPARATUS

Filed June 30, 1967 2 Sheets-Sheet 2

3,409,842
PROTECTION SYSTEMS AND APPARATUS
Kenneth Harry Embling and Leonard Cameron Lebar, Thornton Heath, England, assignors to Electronic Machine Control (Sales) Limited
Filed June 30, 1967, Ser. No. 650,448
Claims priority, application Great Britain, July 1, 1966, 29,614/66
7 Claims. (Cl. 331—65)

ABSTRACT OF THE DISCLOSURE

The specification of this application discloses protection apparatus for protecting machine operators from moving parts of machines which stops or inhibits operation of the machine with which it is used when an operator's hand is placed in an aperture in a guard frame through which access to the moving parts may be had, the apparatus incorporating self-checking means which ensure that the protective provisions are operating satisfactorily by periodically simulating the effect of the presence of an operator's hand in the guard frame aperture.

The present invention relates to protection systems and apparatus for protecting operators from moving machine parts and more particularly to such systems and apparatus that will fail safe.

A problem which arises with operator protection apparatus is to ensure that it is in working order at all times when it is required to protect an operator and that such fact is manifest to the operator. The present invention contemplates overcoming this problem by incorporating automatic self-checking means in the apparatus and by providing means which can be so associated with the machine in conjunction with which the apparatus to be used that such mechine cannot be operated unless the self-checking means is yielding an output indicative of proper operation of the protection apparatus.

The invention also provides an improved form of operator protection apparatus which incorporates an automatic self-checking arrangement.

According to the invention there is provided protection apparatus comprising an apertured guard frame responsive to obstruction of the free space within its aperture to vary an electrical parameter thereof, an electrical oscillatory circuit including said guard frame and responsive to said variation in said parameter to inhibit oscillation, means responsive to the oscillatory output of said circuit to simulate said parameter variation and cause inhibition of oscillation by said circuit whereby said circuit is caused to execute a repeated fixed cycle of oscillation and non-oscillation periods, and means responsive to variation in said fixed cycle to initiate protective action.

Figure 1:
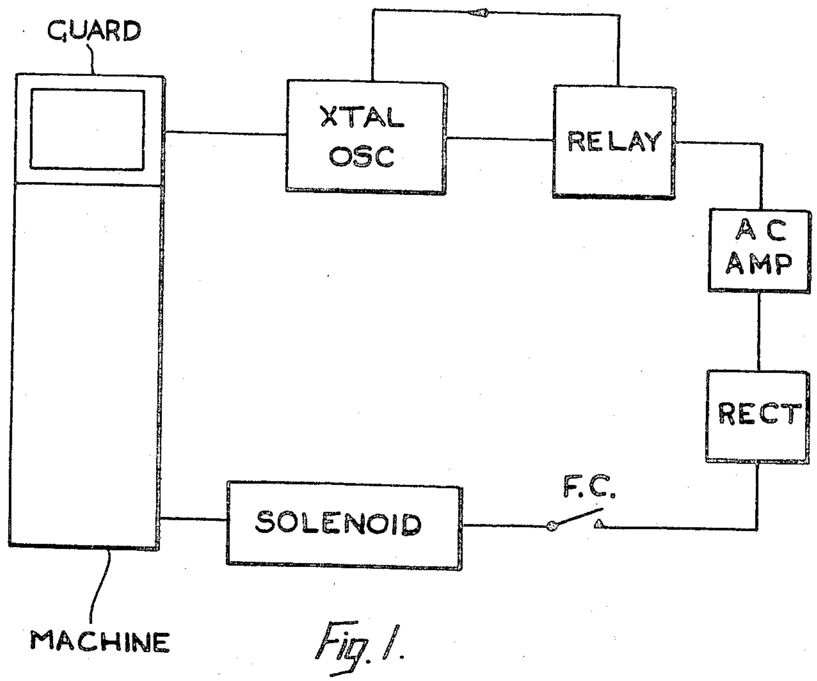
Figure 2:
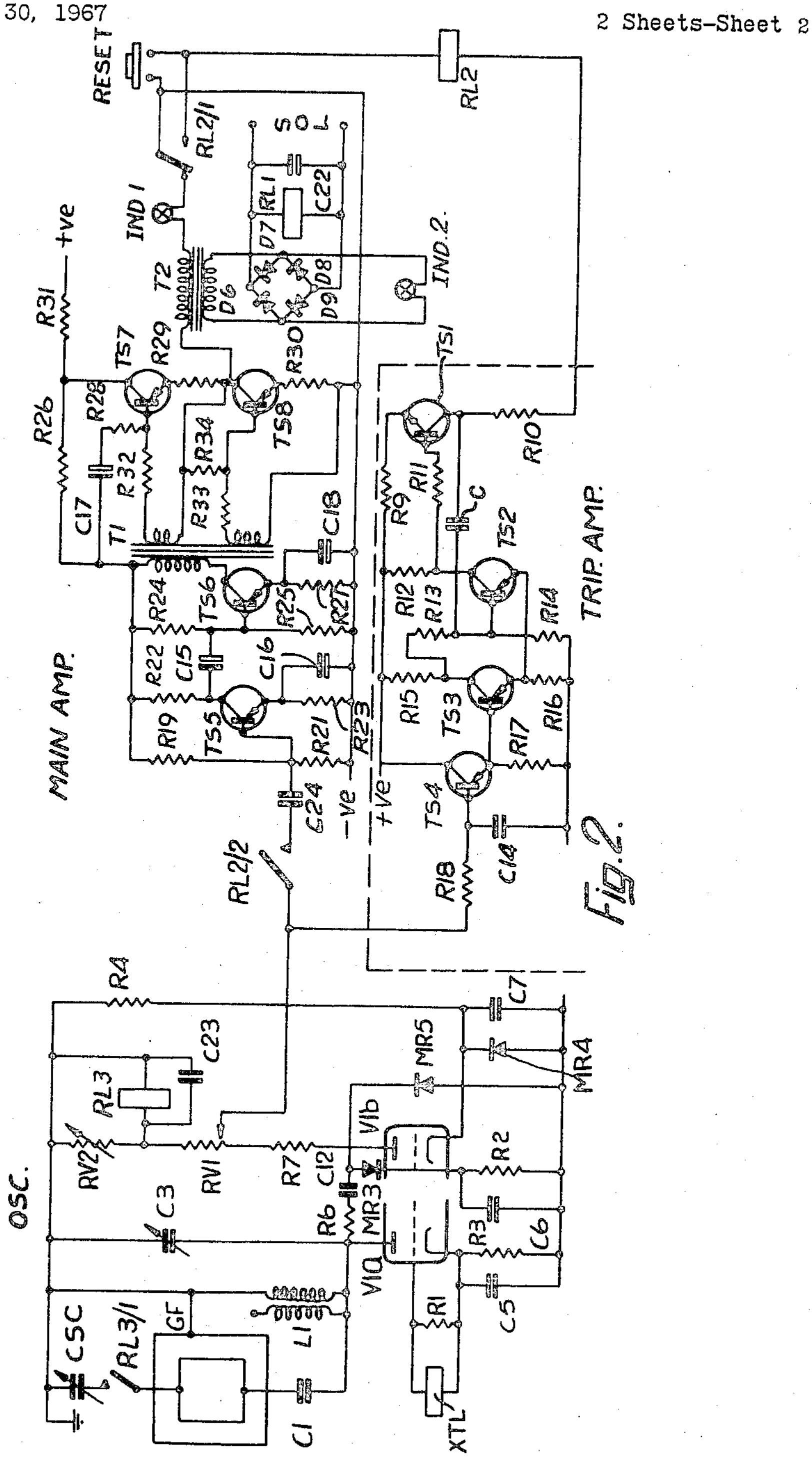

The various features and advantages of the invention will be apparent from the following description of an exemplary embodiment thereof taken in conjunction with the accompanying drawings of which, FIGURE 1 is a block schematic diagram of an operator protection system incorporating the invention, and FIGURE 2 is a circuit diagram of the electronic apparatus of FIGURE 1.

In FIGURE 1 of the drawing the machine to which the system is applied is indicated by the block labelled Machine and it is to be understood that all moving parts except those to which it is necessary for the operator to have access are adequately encased or fenced. It is arranged that the operator only has access to the interior of the machine through the central aperture of an open frame guard member and that the machine itself can only be operated when a fail-safe solenoid is energised.

The guard forms part of the circuit of an electronic oscillator, preferably a crystal oscillator tuned to oscillate at, say 10 mc./s., when the central aperture of the guard is free from any obstruction, and to cease oscillating immediately when anything is placed in the guard aperture. The output of the oscillator is fed through an amplifier and rectifying circuit to provide a suitable voltage for energising the fail-safe solenoid which must be energised for the machine to operate. This voltage can be applied to the fail-safe solenoid by contacts F.C. which may, for example, be contacts of the operator's foot control or any other device for switching the machine on.

It will be appreciated that the protection system thus far described must be in proper operating state and there must be nothing obstructing the aperture in the guard before the machine can be operated.

The self-checking feature is provided by a relay, preferably a reed-type relay, connected so as to be energised by the output of the oscillator and having contacts arranged to modify the circuit of the oscillator to an extent equivalent to the most minor obstruction of the aperture in the guard it is desired to have the apparatus respond to. In setting up the oscillator it is arranged that the modification introduced by the relay is sufficient to prevent the oscillator oscillating with the result that the relay in unenergised state responds to the oscillator output, operates, thereby modifying the oscillator circuit and causing the oscillator to cease oscillating. The absence of output from the oscillator releases the relay, the modification of the oscillator circuit is removed and the oscillator resumes oscillation. This cycle of events is repeated continuously at a frequency determined largely by the operate and release delays of the relay and can conveniently be at 300 c.p.s.

This cyclic operation of the relay checks the operational state of the protection system continuously and moreover, since the output of the oscillator, interrupted at the frequency of the self-checking cycle, provides the power for operating the fail-safe solenoid, the machine cannot be operated unless the protection system is working properly.

Where the electrical power for operating the protective system is obtained from an A.C. supply, a further precaution against false operation is provided by rendering the amplifier and rectifier arrangements inefficient at the frequency of the A.C. supply, in addition to the normal precautions taken to eliminate supply "hum," so that even if the latter precautions should fail the arrangement is incapable of providing sufficient voltage from the A.C. leakage signal to bring about energisation of the fail-safe solenoid.

FIGURE 2 is a circuit diagram of one practical form of the apparatus described in connection with FIGURE 1 employing a thermionic tube for the oscillator stage and transistors for the amplifier stages. It will be appreciated that equivalent transistor circuits could be employed in place of the thermionic tube circuits of the oscillator stage.

The oscillator stage comprises an oscillator constituted by one half V1*a* of a double-triode thermionic tube V1 connected as a crystal controlled oscillator and a switching device constituted by the other half V1*b* of tube V1. The oscillator V1*a* has a 10 mc./s. crystal XTL in parallel with a resistor R1 connected in its grid circuit, and a tank circuit which includes an inductor L1 tuned by capacitance constituted in part by C1 and C3 and in part by the guard frame GF of the machine to be protected. This guard frame has connected across it an adjustable capacitor CSC in series with an open relay contact RL3/1 which will be referred to later.

A proportion of the oscillatory output of oscillator V1*a* is fed to two diodes MR3 and MR5 by a resistor R6 in series with a capacitor C12. Diode MR3 is connected to the grid of switch V1*b* and to a resistor R2 across a capacitor C6 to the negative supply line. Switch V1*b* is normally held cut off, its cathode potential being determined by resistor R4 in series with Zener diode MR4 across the supply the diode MR4 having a capacitor C7 connected across it. When the oscillator V1*a* is oscillating the rectified voltage from diodes MR3 and MR5 holds switch V1*b* in conducting condition and when oscillator V1*a* is cut off switch V1*b* reverts to its normal cut off condition.

The anode circuit of switch V1*b* includes a resistor R7 in series with two variable resistors RV1 and RV2 and the voltage across resistor RV2 is applied to a relay RL3, across which a capacitor C23 is connected and which is preferably a reed-type relay, in such a manner that when switch V1*b* is conducting relay R13 will be operated and when switch V1*b* is cut off relay RL3 will be released. As previously mentioned, the normally open contacts RL3/1 of relay RL3 are connected in series with the capacitor CSC and by appropriate adjustment of the value of the latter the effect of contacts RL3/1 closing, when relay RL3 operates, upon the capacitance in the tank circuit of oscillator V1*a* is arranged to be the same as would be produced by an operator placing a hand in the aperture of the guard frame GF. This effect in turn is arranged to be sufficient to prevent the oscillator V1*a* continuing to oscillate. Thus the result of switch V1*b* becoming conductive when oscillator V1*a* oscillates is to operate relay RL3, close contacts RL3/1 and stop oscillator V1*a* from oscillating. When oscillator V1*a* stops oscillating, switch V1*b* reverts to cut off state, relay RL3 releases, contacts RL3/1 open and the oscillator V1*a* is once more in a condition to oscillate. This cycle of events is repeated continuously at a frequency dependent largely upon the operate and release delays of the relay RL3 and in practice frequencies of 150 to 200 cycles per second have been found suitable.

The natural delays of the relay RL3 may be augmented if required and the automatic checking cycle duration thereby extended to any desired extent. Equally, the continuous nature of the checking operation may be modified so that checking only takes place when necessary, for example once per machine cycle.

As long as the oscillator V1*a* is functioning properly an alternating current signal at the checking cycle frequency appears in the anode circuit of switch V1*b* and the corresponding voltage at the tapping point of variable resistor RV1 is applied through a resistor R18 and a capacitor C14 to the base of a transistor TS4 which forms the first stage of a trip amplifier constituted by four transistors TS1 to TS4. This amplifier consists of an input stage (transistor TS4) a Schmitt trigger stage (transistors TS3 and TS2) and an output stage (transistor TS1) all arranged in conventional configuration with resistors R9 to R17 and a capacitor C and connected to supply current to a trip relay RL2 connected in series with a reset switch which is spring biased to normally open condition.

The purpose of this trip amplifier is to provide an additional safeguard against malfunctioning of the protective arrangement provided by the oscillator and main amplifier should the oscillator drift to an insensitive condition. With the oscillator V1*a* set to a condition where the sensitivity of the arrangement is such that the guard frame circuit is at the lowest limit of safe operation, resistor RV1 is adjusted so that relay RL2 just falls out, and then the oscillator is re-set to a normal condition of sensitivity. Upon closing the re-set switch with the oscillator in sensitive condition the relay RL2 is energised by the output of the trip amplifier and at its contacts RL2/1 closes a holding circuit for itself which is independent of the re-set switch.

If now the oscillator V1*a* should drift towards insensitive condition the output at the anode of switch V1*b* will fall in amplitude and thus the drive to relay RL3 will decrease. This will modify the mark-to-space ratio of the checking cycle in such a way that the oscillator will remain oscillating for a longer portion of each cycle and thus the average value of voltage developed at the tapping point on resistor RV1 will operate the trip amplifier to release relay RL2.

The tapping point on resistor RV1 is also connected over contacts RL2/2 of relay RL2 to capacitor C24 connected to the base of an input transistor TS5 of the main A.C. amplifier at the junction between two resistors R19 and R21. Thus when trip relay is in its normally operated state the contacts RL2/2 are closed and the output of switch V1*b* is also applied to the main amplifier. If the oscillator V1*a* drifts to insensitive condition relay RL2 releases and isolates the main amplifier from the output of V1*b*.

In addition to the input stage TS5, the main amplifier comprises a drive stage (transistor TS6) and an output stage (transistors TS7 and TS8). The emitter circuit of input transistor TS5 comprises a resistor R23 with a capacitor C16 across it and its collector resistor R22 is connected to the junction between two resistors R24 and R25 and to the base of drive transistor TS6 by a capacitor C15. The emitter circuit of drive transistor TS6 comprises a resistor R27 with a capacitor C18 across it and the collector circuit of TS6 includes the primary winding of a coupling transformer T1 and a resistor R26. The transformer T1 has two secondary windings respectively connected between the base and emitter of the two output transistors TS7 and TS8 in series with emitter resistors R29 and R30 and base resistors R32 and R33. A further resistor R34 is connected between the base of transistor TS8 and its collector and a similar resistor R28 in series with a capacitor C17 is connected between the base of transistor TS7 and the primary winding of transformer T1.

The collector circuit of transistor TS8 includes one winding of an output transformer T2 the other winding of which is connected across opposite corners of a full-wave rectifier bridge circuit constituted by diodes D6 to D9 feeding output terminals SOL across which the machine solenoid is connected and the main amplifier serves to provide the current necessary to maintain this solenoid operated.

As long as the oscillator performs its self-checking cycle correctly and does not drift sufficiently to operate the trip relay RL2, the machine solenoid is energised and the operator can use the machine. If the operator inserts a hand or other member into the aperture in the guard frame GF the oscillator V1*a* stops oscillating, the voltage at the tapping point of RV1 in the anode of V1*b* rises and the trip amplifier releases relay RL2 to remove the input to the main amplifier at contacts RL2/2 and thus interrupt energisation of the machine solenoid.

Across the output terminals SOL of the main amplifier are connected a capacitor C22 and a plug-in type relay RL1 which latter serves to provide a control switching operation for use with a machine which cannot conveniently be controlled by a solenoid connected to these output terminals.

The circuit above described also includes two indicator lamps IND1 and IND2 the former of which is connected in series with the primary winding of the output transformer T2 and the latter of which is connected across the secondary winding of T2. Lamp IND2 is preferably a green lamp and is alight whenever the system is operating correctly but goes out when the oscillator is stopped by an operator obstructing the aperture in the guard frame GF. Lamp IND1 serves to indicate when relay RL2 has been released and it is necessary to re-operate the re-set switch to bring the system into operation.

It will be appreciated that the arrangement above described is fail-safe in that the failure of any stage or part to operate correctly will result in cessation of output at terminals SOL.

It will be appreciated that whilst the self-checking arrangements have been described above in connection with a protective system employing a capacitative guard frame they are not limited in their useful application to a system of this type but could equally well be employed in a system employing other means for detecting the presence of an obstruction in an access aperture through which an operator can gain access to the moving parts or electrically dangerous parts of a machine. The principle involved is that the self-checking arrangement should be brought into operation by the correct operation of the system, should then simulate the condition it is desired to guard against thus terminating its own operation and permitting the system to resume normal operation, the sequence being repeated at a desired frequency all the time the system is in operation.

We claim:

1. Protection apparatus comprising an apertured guard frame responsive to obstruction of the free space within its aperture to vary an electrical parameter thereof, an electrical oscillatory circuit including said guard frame and responsive to said variation in said parameter to inhibit oscillation, means responsive to the oscillatory output of said circuit to simulate said parameter variation and cause inhibition of oscillation by said circuit whereby said circuit is caused to execute a repeated fixed cycle of oscillation and non-oscillation periods, and means responsive to variation in said fixed cycle to initiate protective action.

2. Apparatus according to claim 1 wherein said guard frame is connected as a capacitative element in the tank circuit of a crystal controlled oscillator.

3. Apparatus according to claim 1 wherein said means responsive to said oscillatory output comprises switch means connected to energise an electrical relay for so long as said switch means receives oscillatory output from said circuit, said relay having contacts arranged to modify said oscillatory circuit to an extent to inhibit oscillation therein when said relay is energised.

4. Apparatus according to claim 1 wherein said means responsive to fixed cycle variation comprises a trip amplifier connected to control energisation of an electrical relay having contacts in a signal output circuit of the apparatus and arranged to switch said relay between energised and de-energised states to cause interruption of said signal output circuit in response to departure from said fixed cycle.

5. Apparatus according to claim 4 including means responsive to the oscillatory output of said oscillatory circuit to provide an alternating current signal having a frequency equal to the repetition frequency of said fixed cycle and means for amplifying and rectifying said alternating current signal to provide a direct current output signal, and wherein said relay is arranged to interrupt the application of said alternating current signal to said amplifying and rectifying means.

6. Apparatus according to claim 5 wherein said trip amplifier is connected to receive said alternating current signal as an input signal thereto and is responsive to the mean amplitude of said signal to control switching of said relay in dependence upon departure of said alternating current signal from a predetermined mark to space ratio corresponding to normal operation of said oscillatory circuit with said fixed cycle.

7. Apparatus according to claim 1 wherein said guard frame is connected as a capacitative element in said oscillatory circuit in such a manner that variation in its capacitance due to obstruction of its aperture inhibits oscillation in said circuit, said means responsive to said oscillatory output comprises switch means arranged to provide an alternating current signal at the frequency of said fixed cycle and a first electrical relay arranged to be energised and de-energised by said alternating current signal at the frequency thereof, said relay having contacts connected to introduce into and exclude from said oscillatory circuit a capacitor having a value sufficient to inhibit oscillation in said oscillatory circuit, and said means responsive to fixed cycle variation comprises a trip amplifier responsive to the mean amplitude of said alternating current signal to switch a second electrical relay between energised and de-energised states in dependence upon whether said mean value remains at a predetermined level or departs from such level, said second relay having contacts arranged to apply said alternating current signal to amplifying and rectifying means connected to output terminals of the apparatus when said mean amplitude is at said predetermined level.

No references cited.

IOHN KOMINSKI, *Primary Examiner.*